US012673614B2

(12) United States Patent
Berne et al.

(10) Patent No.: US 12,673,614 B2
(45) Date of Patent: Jul. 7, 2026

(54) VIRTUAL OVERLAYS IN CAMERA MIRROR SYSTEMS

(71) Applicant: Volvo Truck Corporation, Gothenburg (SE)

(72) Inventors: Nicolas Berne, Askim (SE); Mohammed Rachidi, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 168 days.

(21) Appl. No.: 18/427,979

(22) Filed: Jan. 31, 2024

(65) Prior Publication Data

US 2024/0270173 A1     Aug. 15, 2024

(30) Foreign Application Priority Data

Feb. 14, 2023    (EP) ..................................... 23156598

(51) Int. Cl.
*B60R 1/28*        (2022.01)
*B62D 15/02*       (2006.01)
*G06V 20/56*       (2022.01)

(52) U.S. Cl.
CPC ................ *B60R 1/28* (2022.01); *G06V 20/56* (2022.01); *B60R 2300/308* (2013.01); *B62D 15/027* (2013.01); *G06V 2201/07* (2022.01)

(58) Field of Classification Search
CPC ................ B60R 1/28; B60R 2300/108; B60R 2300/308; G06T 7/60; G06T 7/73;
(Continued)

(56) References Cited

U.S. PATENT DOCUMENTS 8,930,140 B2 *   1/2015  Trombley ............ B62D 15/027
                                                    701/28
9,085,261 B2 *   7/2015  Lu .......................... B60Q 9/005
(Continued)

FOREIGN PATENT DOCUMENTS

DE       102016002470 A1    8/2017
DE       102020108416 A1 *  9/2021    ............... B60D 1/62
(Continued)

OTHER PUBLICATIONS

Extended European Search Report for European Patent Application No. 23156598.7, mailed Jul. 18, 2023, 9 pages.

*Primary Examiner* — Peter D Nolan
(74) *Attorney, Agent, or Firm* — Withrow & Terranova, PLLC

(57) ABSTRACT

A computer system comprising a processor device configured to receive initial image data from at least one camera of a vehicle; detect, in the initial image data, at least one predetermined target mounted to a trailer of the vehicle, the at least one predetermined target at an initial position and initial angular orientation relative to the at least one camera; position a virtual assist feature in a first position and a first angular orientation in a display view based on the initial position and the initial angular orientation of the at least one predetermined target; detect, in subsequent image data, the at least one predetermined target at a subsequent position and a subsequent angular orientation relative to the at least one camera; and adjust the virtual assist feature in the display view based on the subsequent position and the subsequent angular orientation relative to the at least one camera.

19 Claims, 8 Drawing Sheets

(58) Field of Classification Search
     CPC ........... G06T 19/20; G06T 2207/30204; G06T
                2207/30252; G06T 2219/2004; G06T
                7/80; G06V 20/56; G06V 2201/07; B62D
                                              15/027
     See application file for complete search history.

(56)                    References Cited

U.S. PATENT DOCUMENTS

|  |  |  |  |  |
|---|---|---|---|---|
| 9,102,271 | B2 * | 8/2015 | Trombley | ............... B60R 1/003 |
| 9,102,272 | B2 * | 8/2015 | Trombley | ............... B62D 13/06 |
| 9,283,892 | B2 * | 3/2016 | Trombley | ............ B62D 15/027 |
| 9,950,738 | B2 * | 4/2018 | Lu | ............................. B60D 1/62 |
| 10,858,042 | B2 * | 12/2020 | Lu | ............................ G06T 7/246 |
| 2014/0058614 | A1 * | 2/2014 | Trombley | ............ B62D 15/027 |
|  |  |  |  | 701/29.1 |
| 2014/0058622 | A1 * | 2/2014 | Trombley | ............... B60R 1/003 |
|  |  |  |  | 701/33.2 |
| 2014/0058655 | A1 * | 2/2014 | Trombley | ................ B60D 1/00 |
|  |  |  |  | 701/300 |
| 2014/0058668 | A1 * | 2/2014 | Trombley | ................ B60R 1/26 |
|  |  |  |  | 701/523 |
| 2014/0200759 | A1 * | 7/2014 | Lu | ............................. G06T 7/73 |
|  |  |  |  | 701/28 |
| 2015/0321697 | A1 * | 11/2015 | Lu | ........................... B60C 9/005 |
|  |  |  |  | 701/28 |
| 2018/0251154 | A1 * | 9/2018 | Lu | ........................... B60C 9/005 |
| 2020/0285913 | A1 | 9/2020 | Gavrilovic et al. |  |
| 2020/0346581 | A1 * | 11/2020 | Lawson | ................ B60R 1/0612 |
| 2021/0114657 | A1 * | 4/2021 | Lu | ............................. B60D 1/62 |
| 2021/0394686 | A1 | 12/2021 | Germaine et al. |  |
| 2022/0144169 | A1 | 5/2022 | Sperrle et al. |  |

FOREIGN PATENT DOCUMENTS

|  |  |  |  |  |  |
|---|---|---|---|---|---|
| WO | WO-2021155914 | A1 * | 8/2021 | ............. | G06T 11/00 |
| WO | 2021191099 | A1 | 9/2021 |  |  |

* cited by examiner

VIRTUAL OVERLAYS IN CAMERA MIRROR SYSTEMS

PRIORITY APPLICATIONS

The present application claims priority to European Patent Application No. 23156598.7, filed on Feb. 14, 2023, and entitled "VIRTUAL OVERLAYS IN CAMERA MIRROR SYSTEMS," which is incorporated herein by reference in its entirety.

TECHNICAL FIELD

The disclosure relates generally to camera mirror systems for vehicles. In particular aspects, the disclosure relates to virtual overlays in camera mirror systems. The disclosure can be applied in heavy-duty vehicles, such as trucks, buses, and construction equipment. Although the disclosure may be described with respect to a particular vehicle, the disclosure is not restricted to any particular vehicle.

BACKGROUND

Camera mirror systems are becoming more common and are used for assisting a driver of a vehicle to get a better view of the road and objects behind the host vehicle.

Adding distance lines may be added as overlays in a screen view of the captured field of view of the camera. These lines can assist the driver in judging the location of the host vehicle in view of other vehicles or objects behind the host vehicle. This is particularly useful for vehicles with trailers. However, such features may require preexisting knowledge of the trailer and associated information.

SUMMARY

According to a first aspect of the disclosure, there is provided a computer system comprising a processor device configured to: receive initial image data from at least one camera of a vehicle; detect, in the initial image data, at least one predetermined target mounted to a trailer of the vehicle, the at least one predetermined target at an initial position and initial angular orientation relative to the at least one camera; position a virtual assist feature in a first position and a first angular orientation in a display view based on the initial position and the initial angular orientation of the at least one predetermined target, detect, in subsequent image data, the at least one predetermined target at a subsequent position and a subsequent angular orientation relative to the at least one camera, and adjust the virtual assist feature in the display view based on the subsequent position and the subsequent angular orientation relative to the at least one camera.

The first aspect of the disclosure may seek to automatically adjust a virtual assist feature regardless of the trailer type and thereby improve diversity handling of trailers. A technical benefit may include automatic adjustment of virtual assist features for assisting drivers.

According to a second aspect of the disclosure, there is provided a computer-implemented method, comprising: receiving, by a processor device of a computer system, initial image data from at least one camera of a vehicle, detecting, by the processor device, in the initial image data, at least one predetermined target mounted to a trailer of the vehicle, the at least one predetermined target at an initial position and initial angular orientation relative to the at least one camera; positioning, by a processor device, a virtual assist feature in a first position and a first angular orientation in a display view based on and the initial position and initial angular orientation of the at least one predetermined target, detecting, by the processor device, in subsequent image data, the at least one predetermined target at a subsequent position and a subsequent angular orientation relative to the at least one camera, and adjusting by the processor device, the virtual assist feature in the display view based on the subsequent position and the subsequent angular orientation relative to the at least one camera.

The second aspect of the disclosure may seek to provide a method to adjust a virtual assist feature regardless of the trailer type and thereby improve diversity handling of trailers. A technical benefit may include automatic adjustment of virtual assist features for assisting drivers.

In some examples, the initial position and initial angular orientation, and the subsequent position and the subsequent angular orientation of the at least one predetermined target may be determined based on a predetermined transformation function from position and angular orientation relative to the at least one camera, to position and angular orientation in the display view. A technical benefit may include that the transfer function may provide improved consistency in the transfer from position and angular orientation in the camera field of view to the display view.

In some examples, the method may comprise: detecting, by the processor device, a predetermined calibration marker with known dimensions and at a known location relative the camera, and determining, by the processor device, the predetermined transformation function based at least on the known dimensions and the known location of the predetermined calibration marker and based on the pixel layout of the display view, the predetermined transformation function representing a rotation-translation transformation from the camera field of view to the display view. A technical benefit may include that the accuracy in positioning of the virtual assist feature in the display view is improved with this calibration procedure.

In some examples, the predetermined markers may have a predetermined size and a predetermined shape. A technical benefit may include higher accuracy calibration and marker detection.

In some examples, detecting the predetermined marker in the image data may be based on image analysis. A technical benefit may include that the camera that detect light in the visual spectrum may be used that provides for a clear viewable display view for a user. The camera may include color sensitive pixels.

In some examples, the predetermined markers have layouts distinguishable from each other. That is, the predetermined markers are unique, which advantageously provides for assigning unique virtual assist features to different predetermined markers.

In some examples, the method may further comprise positioning, by the processor device, a second virtual assist feature in a second position and second angular orientation in the display view, and adjusting, by the processor device, each of the virtual assist features in the at least one display view according to the subsequent position and subsequent angular orientation. A technical benefit may include that more complex and informative virtual assist features may be provided.

In some examples, the method may further comprise detecting, by the processor device, a set of predetermined targets mounted on the trailer at or near corners of the trailer, calculating, by the processor device, dimensions of the trailer based on differences in initial positions or subsequent positions for the set of predetermined targets, and providing, by the processor device, a message including the calculated dimensions of the trailer to a user interface of the vehicle or to a memory storage. A technical benefit may include that the dimensions of the trailer can be provided even when a new trailer is used, without the need for recalibration. Thus, providing trailer dimensions to a user for a new trailer is facilitated.

In some examples, the method may include positioning, by the processor device, a three-dimensional virtual assist feature mapped into the display view. A three-dimensional virtual assist feature may advantageously provide even more accurate and informative virtual assist features.

In some examples, the method may comprise generating, by the processor device, at least one virtual assist feature offset from the outline of the trailer in the display view. A technical benefit may include that so-called end-of-vehicle lines that indicate trailer length may be provided.

In some examples, the method may comprise detecting, by the processor device, a new predetermined target in the display view, and positioning, by the processor device, a new virtual assist feature in the display view. A technical benefit may be that the number of targets and thereby possible virtual assist features are easily expanded.

In some examples, image data may be received from two rearward facing cameras arranged on opposite sides of a cab of the vehicle, and predetermined targets mounted on two sides of the trailer are detected, wherein virtual assist features are positioned and adjusted in the two display views. A technical benefit may be that virtual assist features for both sides of the vehicle are provided.

In some examples, the method may comprise detecting, by the processor device, in the image data, at least two predetermined targets; positioning, by the processor device, the virtual assist feature in the display view reaching between the first positions of each of the at least two detected predetermined targets, and adjusting each of the first positions and first angular orientations according to the respective subsequent position and subsequent angular orientation. A technical benefit may be more complex virtual assist features are enabled by combining the detected locations of multiple predetermined targets.

In some examples, the method may include retrieving, by the processor device, the virtual assist feature from a library of predetermined virtual assist features, and positioning, by the processor device, the retrieved virtual assist feature in the first position and the first angular orientation in the display view. A technical benefit may be that the required processing power by the processor device is reduced by having predetermined virtual assist features.

In some examples, the method may comprise: detecting, by the processor device, in the initial image data, two or more of the at least one predetermined target, at initial positions and initial angular orientations relative to the at least one camera based on image analysis, the predetermined markers have a predetermined shape and are distinguishable from each other; positioning, by a processor device, a virtual assist feature for each of the predetermined markers in respective first positions and first angular orientations in a display view determined from the initial positions and initial angular orientations and a predetermined transformation function configured to transform a location in the camera field of view to pixels in the display view, detecting, by the processor device, in subsequent image data, the at least two predetermined targets at subsequent positions and subsequent angular orientations relative to the at least one camera based on image analysis, adjusting by the processor device, the virtual assist features in the at least one display view according to the subsequent positions and subsequent angular orientations relative to the at least one camera and the predetermined transformation function, and in each of the initial image data and the and subsequent image data, calculating, by the processor device, dimensions of the trailer based on differences in each of initial positions and subsequent positions for the predetermined targets, providing, by the processor device, for each of the initial image data and the subsequent image data, a message including the calculated dimensions of the trailer to a user interface of the vehicle or to a memory storage.

There is further provided a vehicle comprising the processor device to perform the method of any of the examples of the second aspect.

There is further provided a computer program product comprising program code for performing, when executed by the processor device, the method of any of the examples of the second aspect.

There is further provided a control system comprising one or more control units configured to perform the method of any of the examples of the second aspect.

There is further provided a non-transitory computer-readable storage medium comprising instructions, which when executed by the processor device, cause the processor device to perform the method of any of the examples of the second aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

DETAILED DESCRIPTION

Aspects set forth below represent the necessary information to enable those skilled in the art to practice the disclosure.

Vehicles such as trucks may be equipped with support functions and apparatuses to display the trailer on a screen with overlays to assist the driver in location of the trailer in relation to surrounding objects and other vehicles. Such support functions typically require size information about the trailer to place the overlay correctly, thus, switching to a new trailer requires re-calibrating the overlay. Furthermore, the graphics of the overlay is typically of very simple nature and may not always give adequate support for the user.

Using predetermined markers may address at least some of the drawbacks of prior art.

Figure 1:
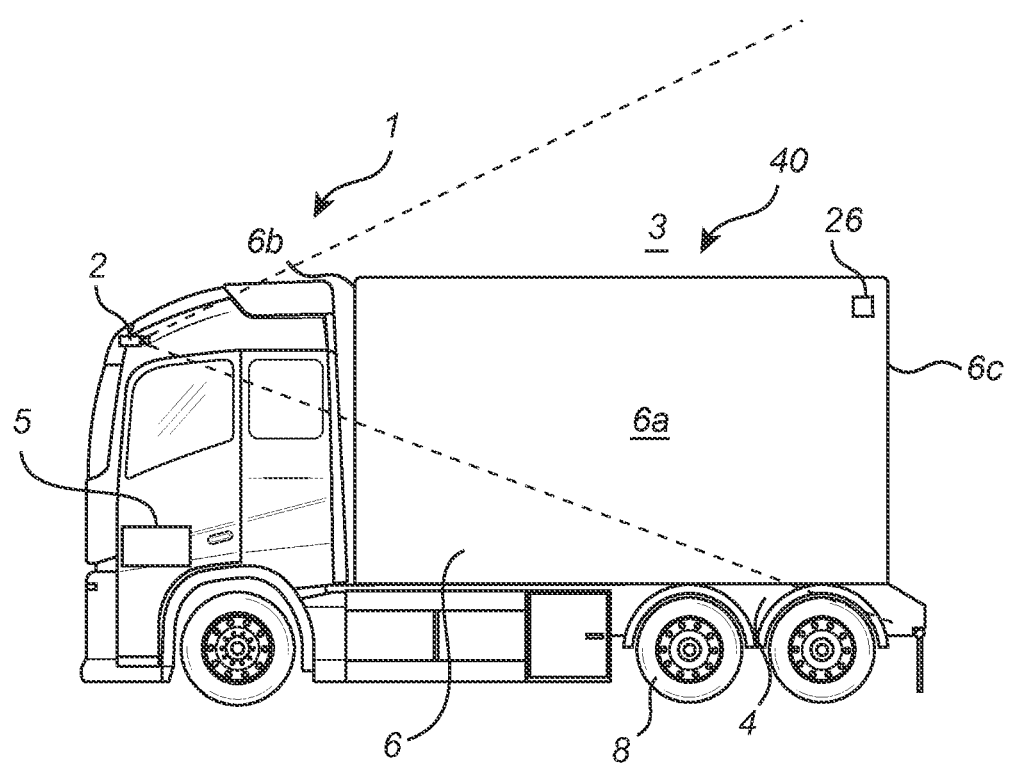
FIG. 1 is an exemplary vehicle according to one example.

FIG. 1 is a truck 1 according to one example vehicle. The truck 1 comprises a camera 2 facing with its field of view 3 in the rear direction. The truck 1 further comprises a processing device 5.

The truck 1 is attached to a trailer 40 comprising a cabin 6 having a side surface 6*a* facing in a transversal direction and a front surface 6*b* and a rear surface 6*c*. The trailer 40 further includes a chassis 4 supporting the cabin and being carried by wheels 8.

A predetermined target 26 is attached to the cabin of the trailer. The predetermined marker 26 may be printed on a sheet material and attached to the cabin 6 of the trailer 40 using an adhesive.

The predetermined target 26 includes a distinguishable pattern that is detectable by the camera 2. In case more than one predetermined target 26 is used they are of the same type and size, but distinguishable from each other. Generally, the predetermined target 26 may be a fiducial marker typically used for augmented reality system to combine the real-world image with a virtual feature. A typical size of the predetermined target 26 is about 200 mm by 200 mm.

Figure 2:
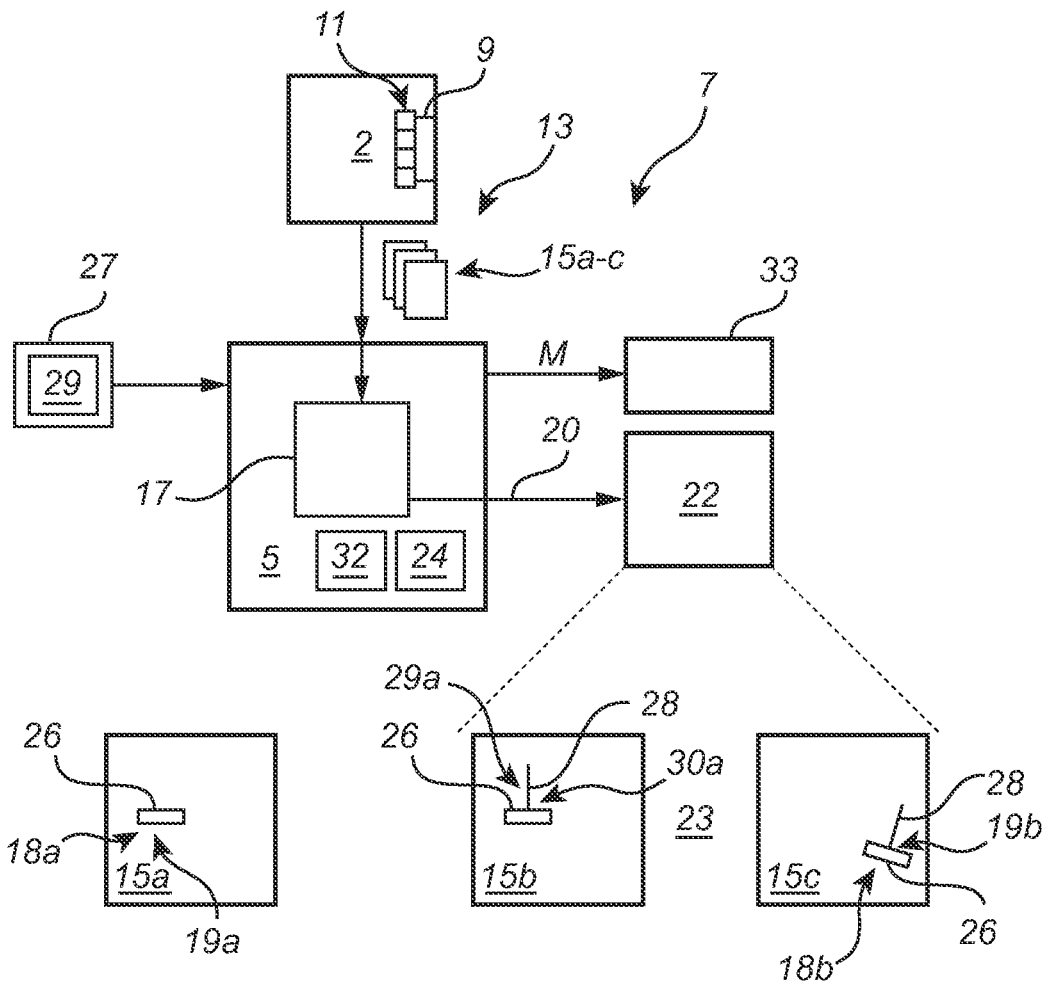
FIG. 2 is an exemplary system diagram according to one example computer system.

FIG. 2 is an exemplary system diagram of a computer system according 7 to one example. The computer system 7 comprises a processor device 5 configured to receive a video stream 13 comprising image frames, here exemplified as image frames 15*a-c*, such as from a camera 2. The camera 2 comprises optics 9 and a pixel array 11 of light sensitive pixels that convert light to electric signals for capturing an image. Further, as applicable, the camera 2 may include optical filters and other electrical and/or optical components. The camera 2 may comprise color sensitive pixels detecting incident light, where the pixels may be configured to detect light in the visual spectrum.

The processor device 5 is configured to operate an image pipeline 17 for performing various digital image processing of the image frames 15*a-c*, such as denoising, image scaling, data compression, and framerate conversion, to mention a few examples. The image pipeline 17 provides a final video feed 20 to a display 22.

The processing device 5 receives, via hardwired or wireless data communication, initial image data from at least one camera 2 of a vehicle. The initial image data may be one or more of the image frames 15*a-c* of the video stream 13. Here, purely for example purposes, the image frame 15*a* represents the initial image data.

The processing device 5 is configured to detect, in the initial image data, at least one predetermined target 26 mounted to a trailer of the vehicle. The at least one predetermined target 26 being at an initial position 18*a* and initial angular orientation 19*a* relative to the at least one camera 2. The processing device 5 applies software components 24 for recognizing, locating and estimating a pose of the predetermined target 26 in the view of the camera. In one example implementation, the predetermined markers are so-called Aruco markers. Aruco markers include a distinguishable pattern that is recognizable by software components and are per se known.

Once the predetermined target is detected, the processing device 5 is configured to position a virtual assist feature 28 in a first position 29*a* and a first angular orientation 30*a* in a display view 23 provided by the display 22, based on the initial position 18*a* and the initial angular orientation 19*a* of the at least one predetermined target 26. In other words, no prior information or data regarding the trailer 40 is needed for generating the overlay including the virtual assist feature 28 in the display view 23. The system 7 need only detect the predetermined target 26 in the image data 15*a-c* to be able to produce the virtual assist feature 28 in the display view 23. This further provides for more efficient processing for generating and adjusting the overlay since reduced amount of data is needed for the overlay generation.

The virtual assist feature 28 is a virtual overlay in the display view 23 of the trailer 40 and may be of various kinds. For example, the virtual assist feature 28 may be a line or several lines. The virtual assist feature 28 may be two-dimensional or even three-dimensional object overlayed in the display view 23. For example, the virtual assist feature 28 may be used to outline the trailer 40, or to indicate the rear end of the trailer 40, or the height of the trailer 40.

In subsequent image data, here exemplified by image frame 15*c*, the processor device 5 detects the at least one predetermined target 26 at a subsequent position 18*b* and a subsequent angular orientation 19*b* relative to the at least one camera 2. Thus, the position and angular orientation of the predetermined target 26 has changed relative to the camera 2. The processor device 5 may apply the software components 24 to each of the image frames 15*a-c* of the video stream, and continuously detect the position and angular orientation of the predetermined marker 26. As the predetermined marker 26 moves with respect to the camera 2, the virtual assist feature 28 is adjusted by the processor device 5 based on the subsequent position and the subsequent angular orientation relative to the at least one camera 2.

In one example, the processor device has access to a non-volatile memory storage device 27 storing a library 29 of virtual assist features. The processor device 5 may retrieve the virtual assist feature from the library 29 stored in the memory storage device 27. The retrieved virtual assist feature is positioned, by the processor device, in the first position 29*a* and the first angular orientation 30*a* in the display view 23.

The initial position 18*a* and initial angular orientation 19*a*, and the subsequent position 18*b* and the subsequent angular orientation 19*b* of the at least one predetermined target are determined based on a predetermined transformation function 32 from position and angular orientation relative to the at least one camera 2, to position and angular orientation in the display view 23. The transformation function 32 is configured to transfer coordinates in the camera view to coordinates in the display view.

The processor device 5 may be connected to a user interface 33 and may be configured to provide a message M to the user interface, for example indicating calculated dimensions of a trailer.

Figure 3:
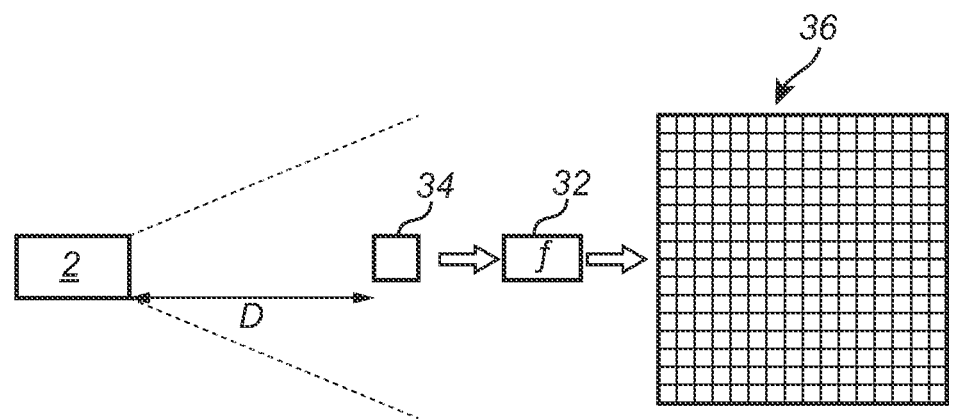
FIG. 3 schematically illustrates a calibration according to one example.

FIG. 3 conceptually illustrates a camera 2 located at a known distance D from predetermined calibration marker 34 with known dimensions and at a known location relative the camera 2. The transformation function 32 may be determined, by the processor device 5, based at least on the known dimensions and the known location of the predetermined calibration marker 34, and based on the pixel layout 36 of the display. The predetermined transformation function 32 representing a rotation-translation transformation from the camera field of view to the display view.

Figure 4:
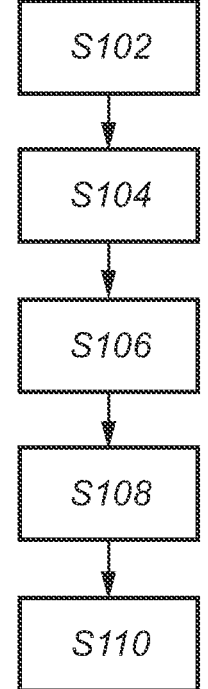
FIG. 4 is a flow chart of an exemplary method.

FIG. 4 is a flow-chart of an exemplary method to adjust a virtual assist feature in a display view.

In step S102, receiving, by a processor device 5 of a computer system 7, initial image data 15a from at least one camera 2 of a vehicle 1.

In step S104, detecting, by the processor device 5, in the initial image data 15a, at least one predetermined target 26 mounted to a trailer 40 of the vehicle 1, the at least one predetermined target 28 at an initial position 18a and initial angular orientation 19a relative to the at least one camera 2.

The predetermined markers 26 may have a predetermined size and a predetermined shape. This advantageously allows for accurate depth perception and pose or angular orientation detection of the predetermined markers 26 in the display view 23. In some examples, the predetermined markers 26 have layouts distinguishable from each other, which enables more accurate distinction between the predetermined markers, when positioning virtual assist features 28 based on more than one predetermined marker 26.

Further, detecting the predetermined marker 26 in the image data 15a-c may be based on image analysis. This further implies that the camera 2 may be camera with color sensitive pixels 11, thus not an IR-camera, or equipment employing LiDAR, or RADAR technology.

In step S106, positioning, by the processor device 5, a virtual assist feature 28 in a first position 29a and a first angular orientation 30a in a display view 23 based on the initial position 18a and initial angular orientation 19a of the at least one predetermined marker 26.

The virtual assist feature 28 may be a one-dimensional virtual assist feature, or a two-dimensional virtual assist feature, or in some examples a three-dimensional virtual assist feature that is mapped into the display view 23.

In step S108, detecting, by the processor device 5, in subsequent image data 15c, the at least one predetermined target 26 at a subsequent position 18b and a subsequent angular orientation 19b relative to the at least one camera 2.

In step S110, adjusting, by the processor device 5, the virtual assist feature in the display view based on the subsequent position and the subsequent angular orientation relative to the at least one camera.

Figures 5A, 5B:
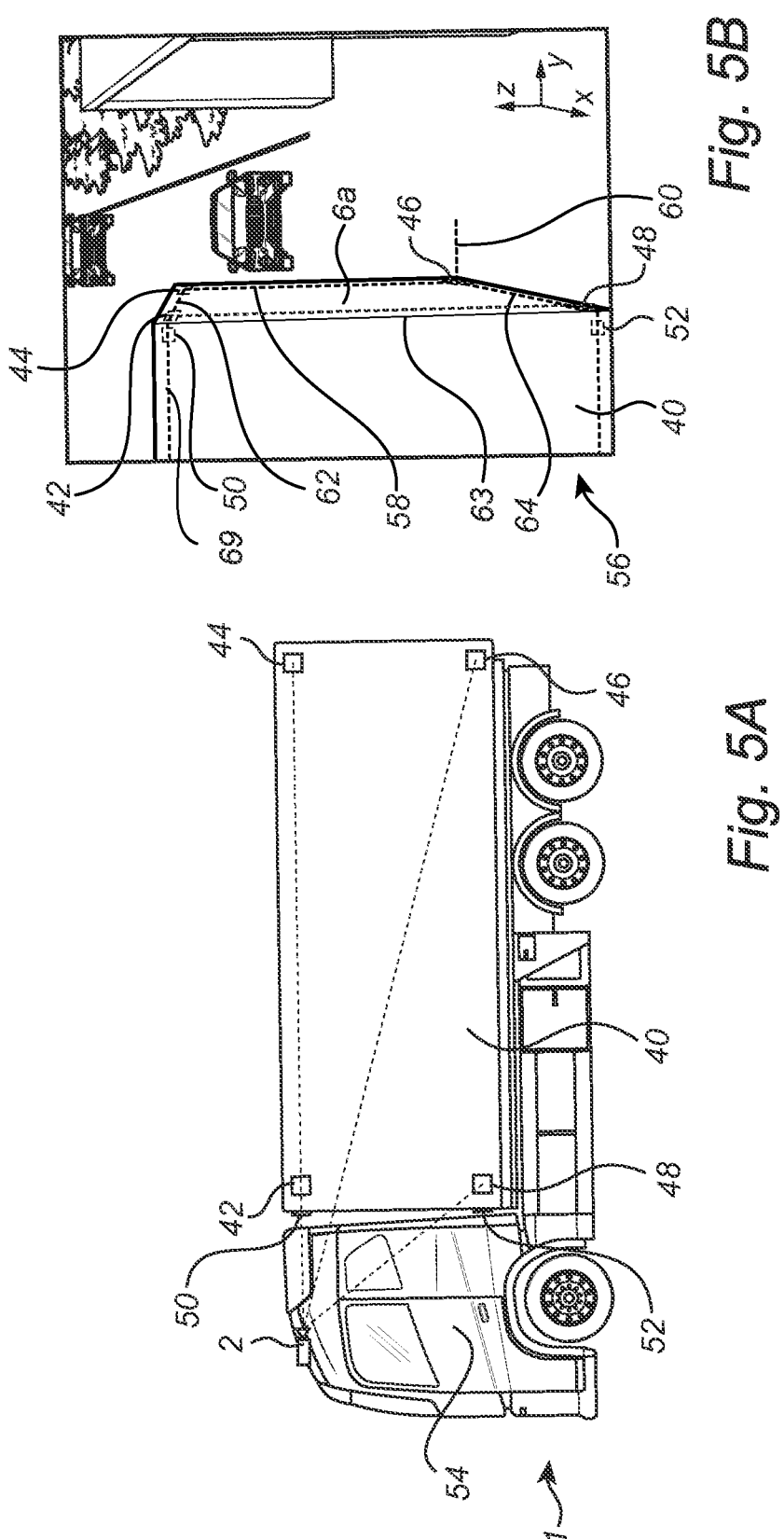
FIG. 5A illustrates a vehicle with a trailer according to one example.
FIG. 5B illustrates a display view according to one example.

FIG. 5A illustrates a vehicle in the form of a truck 1 with a trailer 40. On the side of the trailer 40, a set of predetermined markers 42, 44, 46, 48 are attached. Further, predetermined markers 50, 52 are attached to the forward-looking side of the trailer 40 facing the cab 54 of the vehicle. The predetermined markers 42, 44, 46, 48, 50, 52 may be Aruco markers.

The rearward facing camera 2 captures a video stream shown on a display in the vehicle cab 54 as a display view 56 show in FIG. 5B. In the display view, the predetermined markers 42, 44, 46, 48, 50, 52 are visible attached to the trailer 40. The processing device 5 has thus detected predetermined markers 42, 44, 46, 48, 50, 52 in the video stream and has positioned more than one virtual assist feature in the display view 56. For example, the processing device has positioned a first virtual assist feature 58 along the height of the trailer 40 in z-dimension. Here the predetermined marker 44 may have been detected, and the virtual assist feature 58 is positioned in a position and angular orientation based on the position and angular orientation of the predetermined target 44.

A set of virtual assist features 58, 62, 63, 64 are used to indicate the outline of the trailer 40. This, the virtual assist features 58, 62, 63, 64, which are lines between the positions of the detected predetermined markers 42, 44, 46, 48, provide assisting lines in the display view that indicate the outline of the trailer 40, in this example, the perimeter of the side 6a is outlined.

In a similar way, the processor device has detected a second predetermined target 46 and position a second virtual assist feature 60 in a second position and second angular orientation in the display view 56. It is further noted that the virtual assist feature 60 reaches away from the trailer 40 to an offset location from the outline of the trailer 40 in the display view 56. This offset virtual assist feature 60 provides improved detectability of the rear end of the trailer 40 for a user, when the corresponding predetermined marker 46 is attached at the rear end.

If a new predetermined marker is attached to the trailer 40, for example the predetermined marker 50, the processor device may detect the new predetermined target 50 in the display view 56. That is, with a pre-calibrated system, for example with the transfer function 32 determined, the processor device 5 may automatically detect a new marker. Subsequently, the processor device positions a new virtual assist feature 69 in the display view 56.

Figures 6A, 6B:
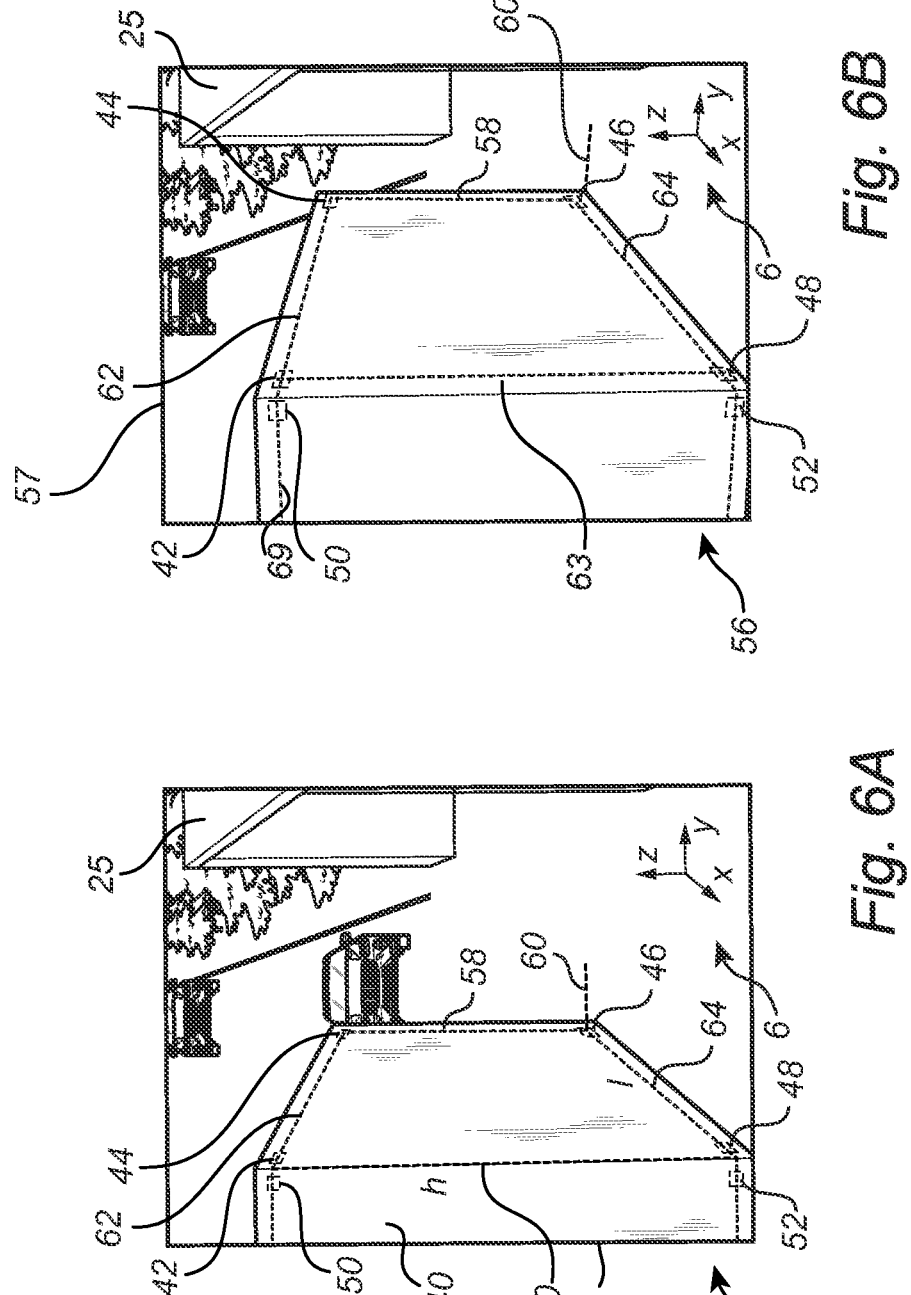
FIG. 6A illustrates a display view according to one example.
FIG. 6B illustrates a display view according to one example.

FIG. 6A illustrates a display view captured by a rearward facing camera of a vehicle. In the image data 55 representing what is shown in the display view 56, a processor device detects at least one predetermined marker 42, 44, 46, 48, 50, 52.

The processor device positions virtual assist features, e.g., virtual assist features 60 and 62, in positions and angular orientations based on the initial position and initial angular orientation of the at least one predetermined target, in this example, the predetermined targets 46 and 44 respectively.

In subsequent image data 57, represented in the display view 56 shown in FIG. 6B, the processor device detects the predetermined targets 46 and 44. In this subsequent image data, the trailer 40 has moved with respect to the camera, here exemplified as the vehicle and trailer turning and reversing towards opening 25. The predetermined markers 42, 44, 46, 48, 50, 52 are attached to and thereby fixed relative trailer 40. Consequently, the predetermined markers 42, 44, 46, 48, 50, 52 move in relation to the camera mounted on the vehicle pulling the trailer 40. Thus, in the subsequent image data represented in the display view 56, the processor device detects the at least one predetermined target 42, 44, 46, 48, 50, 52 at a subsequent position and a subsequent angular orientation relative to the at least one camera.

The virtual assist features 60, 62 are adjusted, by the processor device, in the at least one display view 56 according to the subsequent position and subsequent angular orientation. That is, the virtual assist features 60, 62 maintain their relative positions and angular rotations with respect to the respective predetermined targets 46 and 44 as the trailer 40 moves.

With multiple predetermined targets 42, 44, 46, 48, 50, 52, the processor device may position and adjust individual virtual assist features for the predetermined targets 42, 44, 46, 48, 50, 52. In other examples, when the processor device detects at least two predetermined targets, e.g., predetermined targets 46 and 48, the by the processor device may position a virtual assist feature 64 in the display view reaching between the first positions of each of the at least two detected predetermined targets as shown in FIG. 6A. As subsequent image data is received and the processor device has detected the predetermined targets 46 and 48, the processor device adjusts each of the first positions and first angular orientations according to the respective subsequent position and subsequent angular orientation of the predetermined targets 46 and 48, as shown in FIG. 6B. The adjustment provides for that the virtual assist feature 64 maintain between the predetermined targets 46 and 48 also in the later display view 57. Similarly, the virtual assist feature 62 between predetermined targets 42 and 44 and the virtual assist feature 58 between predetermined targets 44 and 46 maintain between their respective predetermined targets also in the later display view 57. The virtual assist features 58, 62, 63, and 64 indicate the outline of the trailer side.

That the virtual assist features are positioned in each received image data based on the present position and angular position of the detected predetermined markers the user will experience that the virtual assist features in the augmented reality shown in the display are "locked" to the predetermined markers. One advantage of so-called end of vehicle lines 60 which is intended to show the end of the trailer 40, is that they do not need to be re-calibrated depending on the load in the trailer 40 which may cause the trailer 40 to move vertically.

The predetermined markers 42, 44, 46, and 48 are mounted at corners of the trailer 40. In some examples, the processor device detects the set of predetermined targets 42, 44, 46, and 48. This allows the processor device to calculate dimensions, height h and length l, of the trailer 40 based on differences in initial positions or subsequent positions for the set of predetermined targets. The processor device may provide a message including the calculated dimensions of the trailer to a user interface of the vehicle or to a memory storage.

Figure 7:
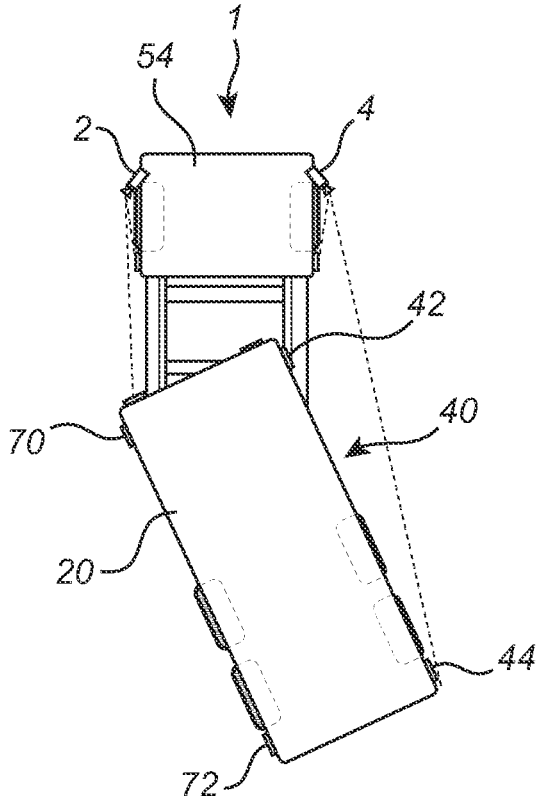
FIG. 7 illustrates a top view of a vehicle with a trailer according to one example.

FIG. 7 is a top-view of a vehicle 1 having a trailer 40 on which predetermined targets 42 and 44 are mounted on one side of the trailer 40, being the same side as a first rearward facing camera 4. On the transversally opposite side of the vehicle cab 54, a second rearward facing camera 2 is located. The second rearward facing camera 2 is arranged to capture images of predetermined targets 70, 72. With two cameras 2, 4, image data is received from two rearward facing cameras and predetermined targets 42, 44, 70, 72 on the two sides of the trailer 40 are detected by the processor device. This provides for virtual assist features being positioned and adjusted in the two display views.

In one example, the method may comprise: detecting, by the processor device, in the initial image data, two or more of the at least one predetermined target, at initial positions and initial angular orientations relative to the at least one camera based on image analysis, the predetermined markers have a predetermined shape and are distinguishable from each other; positioning, by a processor device, a virtual assist feature for each of the predetermined markers in respective first positions and first angular orientations in a display view determined from the initial positions and initial angular orientations and a predetermined transformation function configured to transform a location in the camera field of view to pixels in the display view, detecting, by the processor device, in subsequent image data, the at least two predetermined targets at subsequent positions and subsequent angular orientations relative to the at least one camera based on image analysis, adjusting by the processor device, the virtual assist features in the at least one display view according to the subsequent positions and subsequent angular orientations relative to the at least one camera and the predetermined transformation function, and in each of the initial image data and the and subsequent image data, calculating, by the processor device, dimensions of the trailer based on differences in each of initial positions and subsequent positions for the predetermined targets, providing, by the processor device, for each of the initial image data and the subsequent image data, a message including the calculated dimensions of the trailer to a user interface of the vehicle or to a memory storage.

Figure 8:
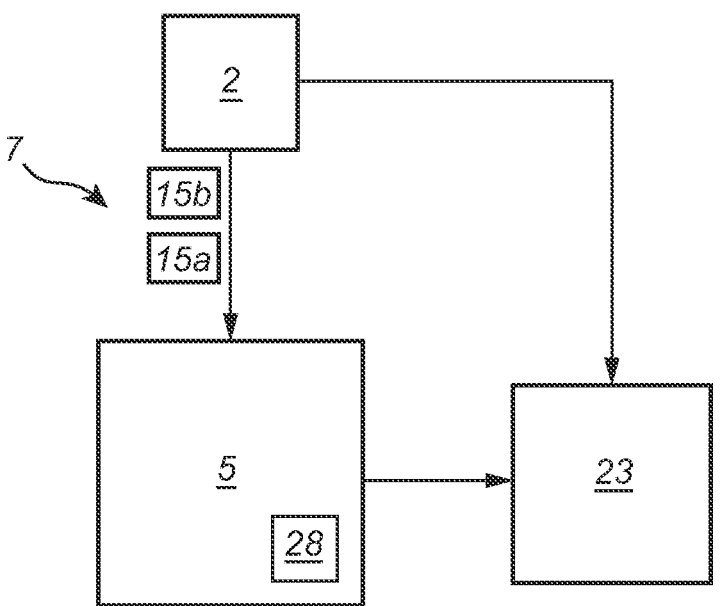
FIG. 8 is another view of FIG. 2, according to another example.

FIG. 8 is another view of FIG. 2, according to another example. FIG. 8 is a view of a computer system 7 comprising a processor device 5 configured to: receive initial image data 15*a* from at least one camera 2 of a vehicle, detect, in the initial image data 15*a*, at least one predetermined target mounted to a trailer of the vehicle, the at least one predetermined target at an initial position and initial angular orientation relative to the at least one camera 2; position a virtual assist feature 28 in a first position and a first angular orientation in a display view 23 based on the initial position and the initial angular orientation of the at least one predetermined target, detect, in subsequent image data 15*b*, the at least one predetermined target at a subsequent position and a subsequent angular orientation relative to the at least one camera, and adjust the virtual assist feature 28 in the display view 23 based on the subsequent position and the subsequent angular orientation relative to the at least one camera.

Figure 9:
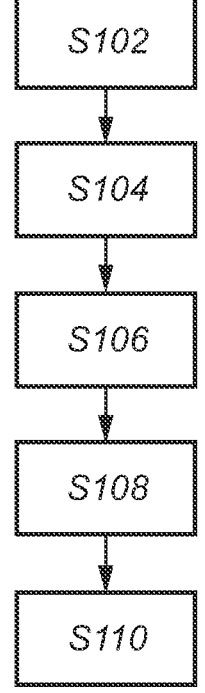
FIG. 9 is a flow chart of an exemplary method according to one example.

FIG. 9 is a flow chart of a method according to one example.

In step S102, receiving by a processor device of a computer system, initial image data from at least one camera of a vehicle.

In step S104, detecting, by the processor device, in the initial image data, at least one predetermined target mounted to a trailer of the vehicle, the at least one predetermined target at an initial position and initial angular orientation relative to the at least one camera.

In step S106, positioning, by the processor device, a virtual assist feature in a first position and a first angular orientation in a display view based on the initial position and initial angular orientation of the at least one predetermined target.

In step S108, detecting, by the processor device, in subsequent image data, the at least one predetermined target at a subsequent position and a subsequent angular orientation relative to the at least one camera.

In step S110, adjusting, by the processor device, the virtual assist feature in the display view based on the subsequent position and the subsequent angular orientation relative to the at least one camera.

Figure 10:
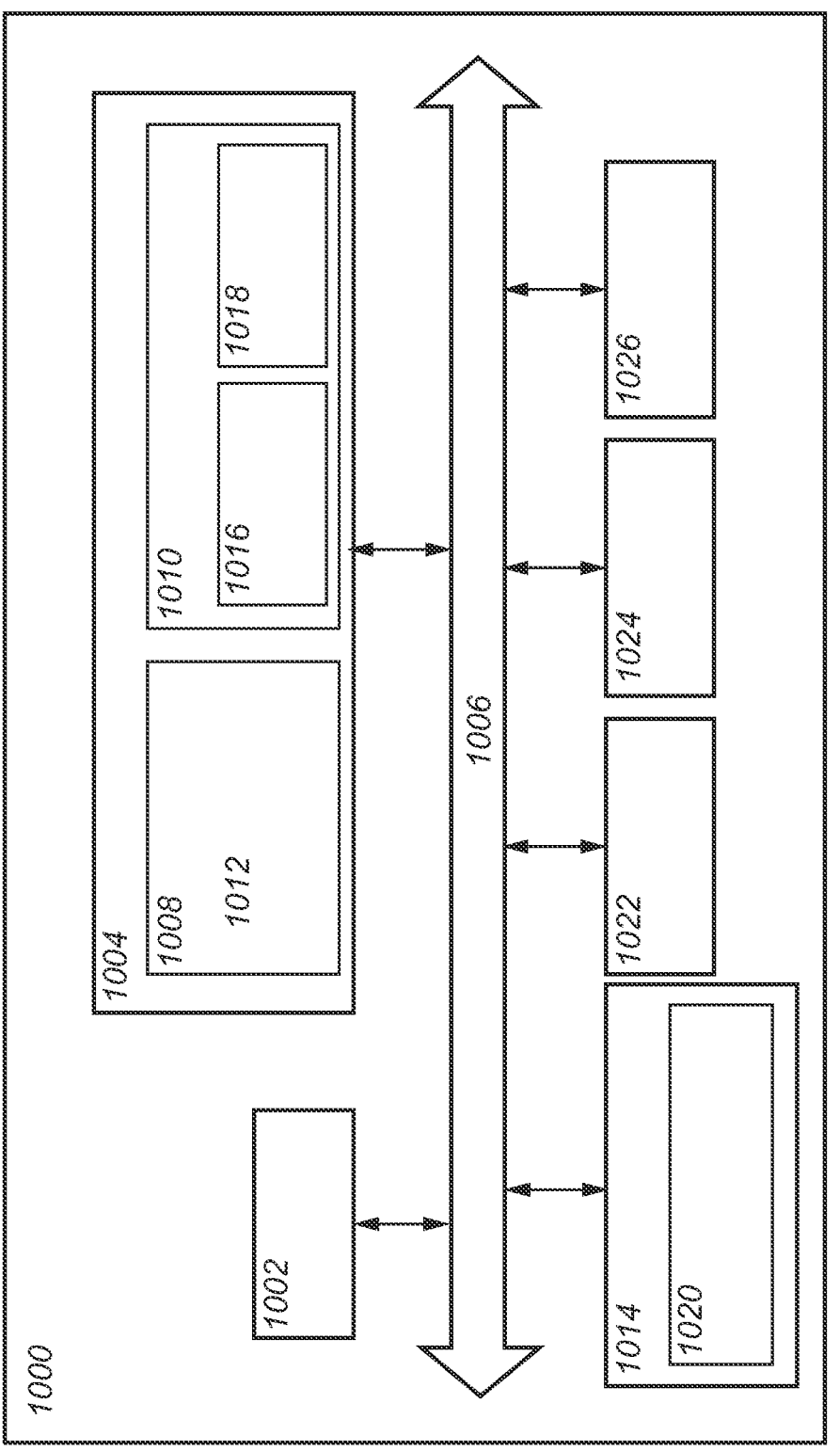
FIG. 10 is a schematic diagram of an exemplary computer system for implementing examples disclosed herein, according to one example.

FIG. 10 is a schematic diagram of a computer system 1000 for implementing examples disclosed herein. The computer system 1000 is adapted to execute instructions from a computer-readable medium to perform these and/or any of the functions or processing described herein. The computer system 1000 may be connected (e.g., networked) to other machines in a LAN, an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include a processor device 1002 (may also be referred to as a control unit), a memory 1004, and a system bus 1006. The computer system 1000 may include at least one computing device having the processor device 1002. The system bus 1006 provides an interface for system components including, but not limited to, the memory 1004 and the processor device 1002. The processor device 1002 may include any number of hardware components for conducting data or signal processing or for executing computer code stored in memory 1004. The processor device 1002 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processor device 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with a processor device 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program product 1020 stored on a transitory or non-transitory computer-usable or computer-readable storage medium (e.g., single medium or multiple media), such as the storage device 1014, which includes complex programming instructions (e.g., complex computer-readable program code) to cause the processor device 1002 to carry out the steps described herein. Thus, the computer-readable program code can comprise software instructions for implementing the functionality of the examples described herein when executed by the processor device 1002. The processor device 1002 may serve as a controller or control system for the computer system 1000 that is to implement the functionality described herein.

The computer system 1000 also may include an input device interface 1022 (e.g., input device interface and/or output device interface). The input device interface 1022 may be configured to receive input and selections to be communicated to the computer system 1000 when executing instructions, such as from a keyboard, mouse, touch-sensitive surface, etc. Such input devices may be connected to the processor device 1002 through the input device interface 1022 coupled to the system bus 1006 but can be connected through other interfaces such as a parallel port, an Institute of Electrical and Electronic Engineers (IEEE) 1394 serial port, a Universal Serial Bus (USB) port, an IR interface, and the like. The computer system 1000 may include an output device interface 1024 configured to forward output, such as to a display, a video display unit (e.g., a liquid crystal display (LCD) or a cathode ray tube (CRT)). The computer system 1000 may also include a communications interface 1026 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

Example 1: A computer system comprising a processor device configured to: receive initial image data from at least one camera of a vehicle; detect, in the initial image data, at least one predetermined target mounted to a trailer of the vehicle, the at least one predetermined target at an initial position and initial angular orientation relative to the at least one camera; position a virtual assist feature in a first position and a first angular orientation in a display view based on the initial position and the initial angular orientation of the at least one predetermined target, detect, in subsequent image data, the at least one predetermined target at a subsequent position and a subsequent angular orientation relative to the at least one camera, and adjust the virtual assist feature in the display view based on the subsequent position and the subsequent angular orientation relative to the at least one camera.

Example 2: A computer-implemented method, comprising: receiving, by a processor device of a computer system, initial image data from at least one camera of a vehicle, detecting, by the processor device, in the initial image data, at least one predetermined target mounted to a trailer of the vehicle, the at least one predetermined target at an initial position and initial angular orientation relative to the at least one camera; positioning, by a processor device, a virtual assist feature in a first position and a first angular orientation in a display view based on the initial position and initial angular orientation of the at least one predetermined target, detecting, by the processor device, in subsequent image data, the at least one predetermined target at a subsequent position and a subsequent angular orientation relative to the at least one camera, and adjusting, by the processor device, the virtual assist feature in the display view based on the subsequent position and the subsequent angular orientation relative to the at least one camera.

Example 3: The method of example 2, where the initial position and initial angular orientation, and the subsequent position and the subsequent angular orientation of the at least one predetermined target are determined based on a predetermined transformation function from position and angular orientation relative to the at least one camera, to position and angular orientation in the display view.

Example 4: The method of example 3, comprising: detecting, by the processor device, a predetermined calibration marker with known dimensions and at a known location relative the camera, and determining, by the processor device, the predetermined transformation function based at least on the known dimensions and the known location of the predetermined calibration marker and based on the pixel layout of the display view, the predetermined transformation function representing a rotation-translation transformation from the camera field of view to the display view.

Example 5: The method of any of examples 2-4, wherein the predetermined markers have a predetermined size and a predetermined shape.

Example 6: The method of any of examples 2-5, wherein detecting the predetermined marker in the image data is based on image analysis.

Example 7: The method of any of examples 2-6, wherein the predetermined markers have layouts distinguishable from each other.

Example 8: The method of any of examples 2-7, further comprising: positioning, by the processor device, a second virtual assist feature in a second position and second angular orientation in the display view, and adjusting, by the processor device, each of the virtual assist features in the at least one display view according to the subsequent position and subsequent angular orientation.

Example 9: The method of any of examples 2-8, further comprising: detecting, by the processor device, a set of predetermined targets mounted on the trailer at or near corners of the trailer, calculating, by the processor device, dimensions of the trailer based on differences in initial positions or subsequent positions for the set of predetermined targets, and providing, by the processor device, a message including the calculated dimensions of the trailer to a user interface of the vehicle or to a memory storage.

Example 10: The method of any of examples 2-9, comprising: positioning, by the processor device, a three-dimensional virtual assist feature mapped into the display view.

Example 11: The method of any of examples 2-10, comprising: generating, by the processor device, at least virtual assist feature offset from the outline of the trailer in the display view.

Example 12: The method of any of examples 2-11, comprising: detecting, by the processor device, a new predetermined target in the display view, and positioning, by the processor device, a new virtual assist feature in the display view.

Example 13: The method of any of examples 2-12, wherein image data is received from two rearward facing cameras arranged on opposite sides of a cab of the vehicle, and predetermined targets mounted on two sides of the trailer are detected, wherein virtual assist features are positioned and adjusted in the two display views.

Example 14: The method of any of examples 2-13, comprising: detecting, by the processor device, in the image data, at least two predetermined targets; positioning, by the processor device, the virtual assist feature in the display view reaching between the first positions of each of the at least two detected predetermined targets, and adjusting each of the first positions and first angular orientations according to the respective subsequent position and subsequent angular orientation.

Example 15: The method of any of examples 2-14, comprising: retrieving, by the processor device, the virtual assist feature from a library of predetermined virtual assist features, and positioning, by the processor device, the retrieved virtual assist feature in the first position and the first angular orientation in the display view.

Example 16: The method of any of examples 2-15, comprising: detecting, by the processor device, in the initial image data, two or more of the at least one predetermined target, at initial positions and initial angular orientations relative to the at least one camera based on image analysis, the predetermined markers have a predetermined shape and are distinguishable from each other; positioning, by a processor device, a virtual assist feature for each of the predetermined markers in respective first positions and first angular orientations in a display view determined from the initial positions and initial angular orientations and a predetermined transformation function configured to transform a location in the camera field of view to pixels in the display view, detecting, by the processor device, in subsequent image data, the at least two predetermined targets at subsequent positions and subsequent angular orientations relative to the at least one camera based on image analysis, adjusting by the processor device, the virtual assist features in the at least one display view according to the subsequent positions and subsequent angular orientations relative to the at least one camera and the predetermined transformation function, and in each of the initial image data and the and subsequent image data, calculating, by the processor device, dimensions of the trailer based on differences in each of initial positions and subsequent positions for the predetermined targets, providing, by the processor device, for each of the initial image data and the subsequent image data, a message including the calculated dimensions of the trailer to a user interface of the vehicle or to a memory storage.

Example 17: A vehicle comprising the processor device to perform the method of any of examples 2-16.

Example 18: A computer program product comprising program code for performing, when executed by the processor device, the method of any of examples 2-16.

Example 19: A control system comprising one or more control units configured to perform the method of any of examples 2-16.

Example 20: A non-transitory computer-readable storage medium comprising instructions, which when executed by the processor device, cause the processor device to perform the method of any of examples 2-16.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer system comprising a processor device configured to:

receive initial image data from at least one camera of a vehicle;

detect, in the initial image data, at least two predetermined targets mounted to a trailer of the vehicle, the at least two predetermined targets at initial positions and initial angular orientations relative to the at least one camera;

16 position a virtual assist feature in first positions and first angular orientations in a display view based on the initial positions and the initial angular orientations of the at least two predetermined targets, the virtual assist feature in the display view reaching between the first positions of each of the at least two predetermined targets;

detect, in subsequent image data, the at least two predetermined targets at respective subsequent positions and respective subsequent angular orientations relative to the at least one camera;

adjust the virtual assist feature in the display view according to the subsequent positions and the subsequent angular orientations relative to the at least one camera.

2. A computer-implemented method, comprising:

receiving, by a processor device of a computer system, initial image data from at least one camera of a vehicle;

detecting, by the processor device, in the initial image data, at least two predetermined target-targets mounted to a trailer of the vehicle, the at least two predetermined target-targets at initial positions and initial angular orientations relative to the at least one camera;

positioning, by a processor device, a virtual assist feature in first positions and first angular orientations in a display view based on the initial positions and the initial angular orientations of the at least two predetermined targets, the virtual assist feature in the display view reaching between the first positions of each of the at least two predetermined targets;

detecting, by the processor device, in subsequent image data, the at least two predetermined targets at respective subsequent positions and respective subsequent angular orientations relative to the at least one camera;

adjusting, by the processor device, the virtual assist feature in the display view based on according to the subsequent positions and the subsequent angular orientations relative to the at least one camera.

3. The method of claim 2, where the initial position and the initial angular orientation, and the subsequent position and the subsequent angular orientation of the at least two predetermined targets, are determined based on a predetermined transformation function from position and angular orientation relative to the at least one camera, to position and angular orientation in the display view.

4. The method of claim 3, further comprising:

detecting, by the processor device, a predetermined calibration marker with known dimensions and at a known location relative the camera; and determining, by the processor device, the predetermined transformation function based at least on the known dimensions and the known location of the predetermined calibration marker and based on a pixel layout of the display view, the predetermined transformation function representing a rotation-translation transformation from a camera field of view to the display view.

5. The method of claim 4, wherein the predetermined marker have a predetermined size and a predetermined shape.

6. The method of claim 4, wherein detecting the predetermined marker in the image data is based on image analysis.

7. The method of claim 4, wherein the predetermined marker have layouts distinguishable from each other.

8. The method of claim 2, further comprising:

positioning, by the processor device, a second virtual assist feature in a second position and second angular orientation in the display view; and adjusting, by the processor device, each of the virtual assist features in the at least one display view according to the subsequent position and the subsequent angular orientation.

9. The method of claim 2, further comprising:

detecting, by the processor device, a set of predetermined targets mounted on the trailer at or near corners of the trailer;

calculating, by the processor device, dimensions of the trailer based on differences in initial positions or subsequent positions for the set of predetermined targets; and providing, by the processor device, a message including the calculated dimensions of the trailer to a user interface of the vehicle or to a memory storage.

10. The method of claim 2, further comprising:

positioning, by the processor device, a three-dimensional virtual assist feature mapped into the display view.

11. The method of claim 2, further comprising:

generating, by the processor device, at least one virtual assist feature offset from an outline of the trailer in the display view.

12. The method of claim 2, further comprising:

detecting, by the processor device, a new predetermined target in the display view; and positioning, by the processor device, a new virtual assist feature in the display view.

13. The method of claim 2, wherein image data is received from two rearward facing cameras arranged on opposite sides of a cab of the vehicle, and predetermined targets mounted on two sides of the trailer are detected;

wherein virtual assist features are positioned and adjusted in the two display views.

14. The method of claim 2, further comprising:

retrieving, by the processor device, the virtual assist feature from a library of predetermined virtual assist features; and positioning, by the processor device, the retrieved virtual assist feature in the first position and the first angular orientation in the display view.

15. The method of claim 2, further comprising:

detecting, by the processor device, in the initial image data, two or more of the at least two predetermined targets, at initial positions and initial angular orientations relative to the at least one camera based on image analysis, predetermined markers have a predetermined shape and are distinguishable from each other;

positioning, by the processor device, a virtual assist feature for each of the predetermined markers in respective first positions and first angular orientations in a display view determined from the initial positions and initial angular orientations and a predetermined transformation function configured to transform a location in a camera field of view to pixels in the display view;

detecting, by the processor device, in subsequent image data, the at least two predetermined targets at subsequent positions and subsequent angular orientations relative to the at least one camera based on image analysis;

adjusting, by the processor device, the virtual assist feature in the display view according to the subsequent positions and subsequent angular orientations relative to the at least one camera and the predetermined transformation function;

in each of the initial image data and the and subsequent image data, calculating, by the processor device, dimensions of the trailer based on differences in each of the initial positions and the subsequent positions for the predetermined targets; and providing, by the processor device, for each of the initial image data and the subsequent image data, a message including the calculated dimensions of the trailer to a user interface of the vehicle or to a memory storage.

16. A vehicle comprising the processor device to perform the method of claim 2.

17. A non-transitory computer program product comprising program code for performing, when executed by the processor device, the method of claim 2.

18. A control system comprising one or more control units configured to perform the method of claim 2.

19. A non-transitory computer-readable storage medium comprising instructions, which when executed by the processor device, cause the processor device to perform the method of claim 2.

* * * * *